United States Patent [19]

Ishikawa

[11] Patent Number: 4,482,994
[45] Date of Patent: Nov. 13, 1984

[54] OPTICAL MULTIPLEXER/DEMULTIPLEXER USING INTERFERENCE FILTERS

[75] Inventor: Shigeta Ishikawa, Tokyo, Japan

[73] Assignee: Nippon Electric Co., Ltd., Tokyo, Japan

[21] Appl. No.: 385,474

[22] Filed: Jun. 7, 1982

[30] Foreign Application Priority Data

Jun. 12, 1981 [JP] Japan ............................ 56-90253

[51] Int. Cl.³ ............................................. H04B 9/00
[52] U.S. Cl. ..................................... 370/3; 350/96.19
[58] Field of Search ............................ 370/1, 2, 3, 4; 350/96.19

[56] References Cited

U.S. PATENT DOCUMENTS 4,244,045  1/1981  Nosu et al. ............................ 370/3

FOREIGN PATENT DOCUMENTS 130504  3/1979  Japan ............................. 350/96.19

OTHER PUBLICATIONS

Miyazaki, Kiyoshi et al. "Optical Multiplexer/Demultiplexers Using Thin-Film Optical Filters", Dec. 1980, 17–36.
Miki, Tetsuya et al. "Viabilities of the Wavelength-Division-Multiplexing Transmission System Over an Optical Fiber Cable", Jul. 1978, 1082–1087.
Ishikawa, Shigeta et al. "Wavelength-Division Multiplexers/Demultiplexers", Oct. 1980, 65–71.
Electronics Letters, Jul. 5, 1979, vol. 15, No. 14, pp. 414 & 415, "Multireflection Optical Multi/Demultiplexer Using Interference Filters", by Kiyoshi Nosu, Hideki Ishio, and Kunio Hashimoto.

Primary Examiner—Joseph A. Orsino, Jr.
Assistant Examiner—Timothy K. Greer
Attorney, Agent, or Firm—Laff, Whitesel, Conte & Saret

[57] ABSTRACT

An optical multiplexer/demultiplexer is used in a wavelength division multiplexing. An optical energy transmission body has N side faces, where N is equal to or larger than three. A first predetermined one of the N side faces directs a single beam of radiant energy, at a predetermined angle, into or out of the body for carrying out the demultiplexing or multiplexing operation. The single beam contains M preselected wavelengths, where M is equal to or smaller than $N-1$. A plurality of beam passing means are associated in a one-to-one correspondence with $(M-1)$ of the N side faces. The beams which pass through the $M-1$ side faces contain a corresponding one of M wavelengths and reflect a beam containing at least one of the M wavelengths, other than the corresponding wavelength. Another of the N side faces passes a beam which is finally reflected by the plurality of beam passing means. Also associated, in one-to-one correspondence, with the plurality of beam passing means and with the other N side face is a beam receiving or emanating means for a corresponding one of the beams passing through the beam passing means and the other N side face, for the completing demultiplexing or multiplexing operation.

13 Claims, 3 Drawing Figures

OPTICAL MULTIPLEXER/DEMULTIPLEXER USING INTERFERENCE FILTERS

The present invention relates to multiplexing systems and, more particularly to an optical multiplexer/demultiplexer using interference filters.

With the recent technological development and the implementation of practical fiber optic transmission systems, a great deal of attention has been paid to a multiple carrier technique referred to as wavelength division multiplexing (WDM). With the WDM technique, an optical multiplexer/demultiplexer responds to a plurality of input beams of radiant energy, each having a different preselected wavelength. These beams are combined into a single beam containing different wavelengths and, conversely, the single combined beam is separated into its constituent wavelengths. In general, such an optical multiplexer/demultiplexer may be composed of either interference filters or diffraction gratings. More specifically, the one using the filters has a less steep penetrating wavelength characteristic than the one using the gratings. Nevertheless, the one with the filters can exhibit an excellent multiplexing capability, over a wide range of wavelengths. Since the filter characteristics of the interference filter can be determined independently of the parameters of the fibers used, any optical fibers may be adapted to be used with the multiplexer/demultiplexer.

An example of the optical multiplexer/demultiplexer outlined above is described by Kiyoshi Nosu et al. in a paper titled "Multireflection Optical Multi/Demultiplexer Using Interference Filters," published in the ELECTRONIC LETTERS, Vol. 15, No. 14, June 5, 1979, pp. 414–415 (Reference). However, with the device shown in FIG. 1 of the Reference, an appreciable amount of insertion loss must be taken into consideration, in practical use. The insertion loss of the multiplexer/demultiplexer using a collimating lens system results from the absorption and scattering which occurs during propagation, and from the aberration of the lens. Both of these factors increase with the rise in the optical path length.

An object of the present invention, therefore, is to provide an optical multiplex/demultiplex device which is improved in insertion loss by adopting a new structure.

According to one aspect of the invention, an optical multiplexer/demultiplexer, for use in a wavelength division multiplexing comprises an optical energy transmission body having N side faces, N being equal to or larger than three. A first predetermined one of the N side faces directs a single beam of radiant energy at a predetermined angle, with respect to the predetermined one side face, into or out of the body for the demultiplexing or multiplexing operation. The single beam contains M preselected wavelengths, M being equal to or smaller than $N-1$. A plurality of beam passing means are associated in a one-to-one correspondence with $(M-1)$ side faces of the N side faces, each of the plurality of beam passing means passes a beam containing a corresponding one of the M wavelengths and reflects a beam containing at least one wavelength of the M wavelengths, other than the corresponding wavelength. A second predetermined one of the N side faces passes a beam finally reflected by the plurality of beam passing. Also, associated in a one-to-one correspondence with the plurality of beam passing means and the second predetermined side face, are a plurality of means for receiving or transmitting a corresponding one of the beams passing through the beam passing means and the second predetermined side face for the demultiplexing or multiplexing operation.

This invention will be described in greater detail in conjunction with the accompanying drawings, wherein.

In the drawings, like reference numerals denote like structual elements.

Figure 1:
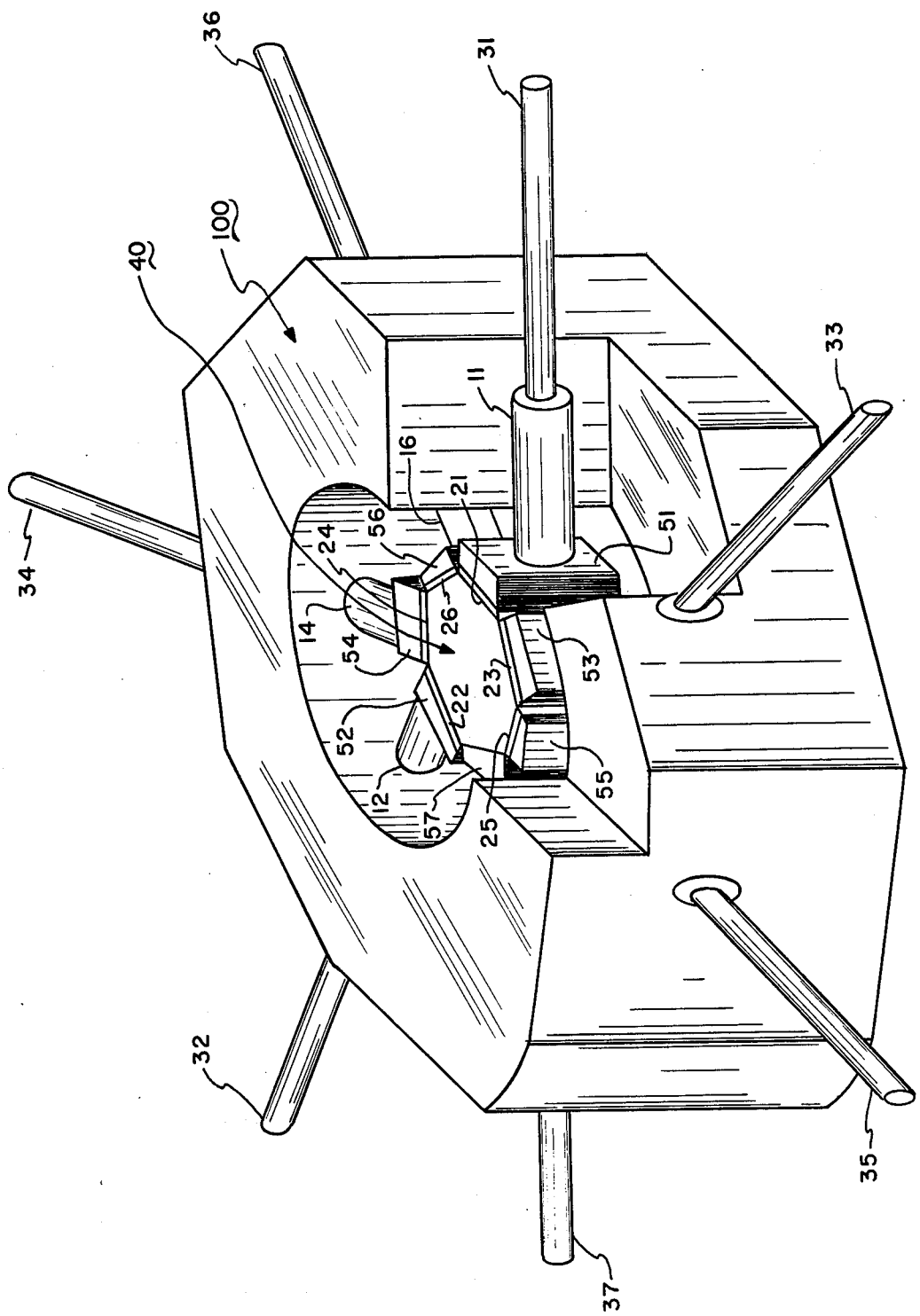
FIG. 1 shows a perspective view of one embodiment of the invention.

Referring to FIG. 1, one embodiment comprises an optical energy transmissive body 40 such as a heptagonal prismatic bulk prism having seven side faces. Interference filters 21 to 26 are selective means provided on six predetermined side faces of the body 40. Collimating lenses 11 to 17 provide for the convergence or collimation of incident beams of radiant energy, and attached to the filters 21 through 26 and to a remaining one side face of the body 40, respectively; optical fibers 31 to 37 provided in one-to-one correspondence to the lenses for outputting the beams which are given from the lenses or for coupling the given beams to the lenses. Spacers 51 to 57 set a predetermined incident angle A (FIG. 2) with respect to each of the seven side faces of the body 40. Each of the filters 21 to 26, has a multilayer structure of $SiO_2$ and $TiO_2$, and are designed to pass only wavelengths $\lambda_1$ to $\lambda_6$, respectively. The structural elements 11 to 17, 21 to 26, 31 to 37, 40, and 51 to 57 are contained in a holder 100, formed of stainless steel.

Figure 2:
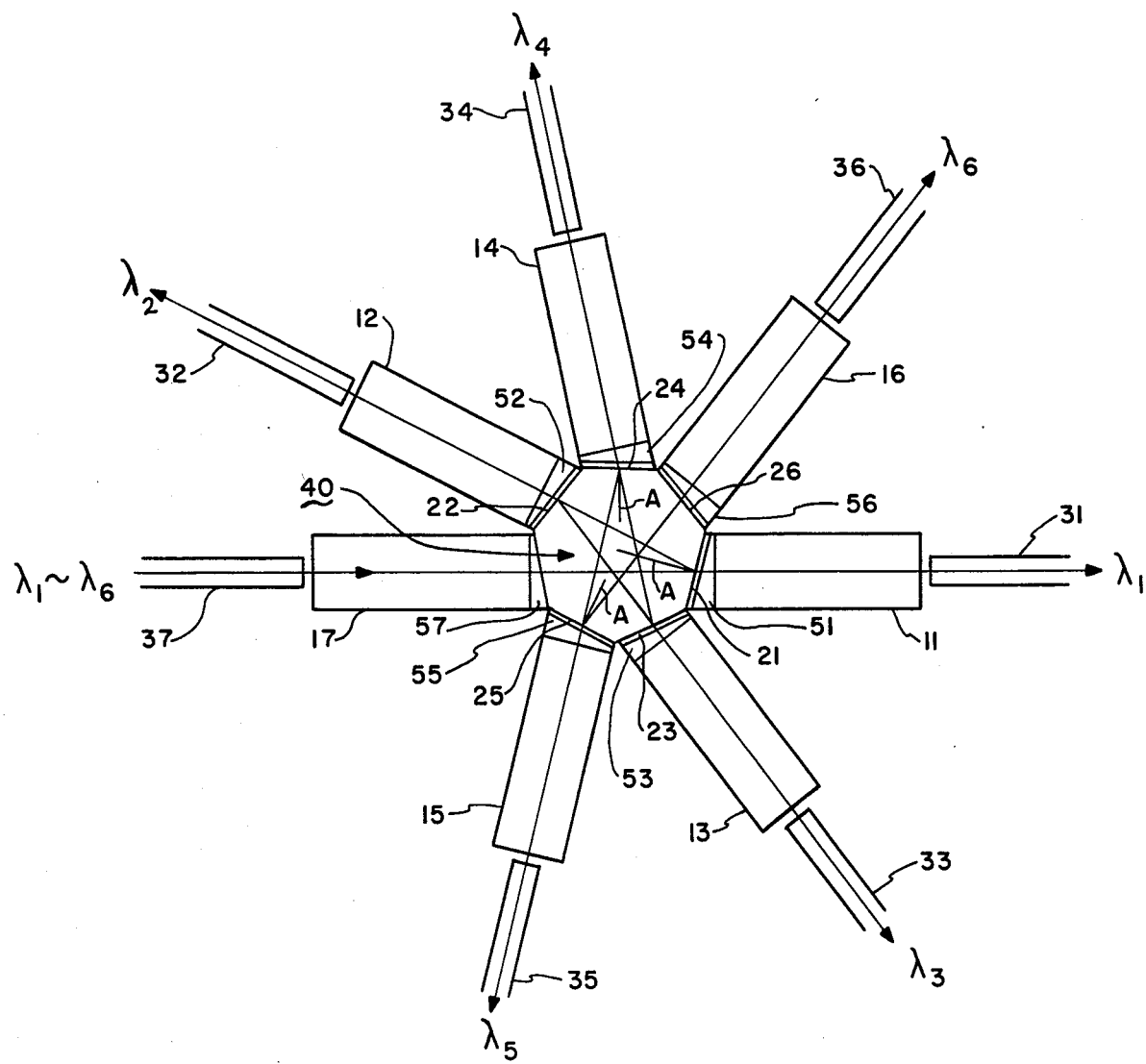
FIG. 2 is a diagram for describing the operation of the embodiment.

Next will be described in detail, the demultiplexing operation of this embodiment with reference to FIGS. 1 and 2. An input beam of radiant energy is provided by any suitable source, such as a laser (not shown), and contains a plurality of wavelengths $\lambda_1$ to $\lambda_6$. This input beam is made incident from the optical fiber 37 onto the lens 17 and is collimated therein. After being transmitted through the spacer 57 and the body 40, the collimated beam is supplied to the frequency selecting filter means 21, which passes only a beam of $\lambda_1$ wavelength. The beam of $\lambda_1$, after passing the filter 21, is converged by the lens 11 and coupled to the output fiber 31. On the other hand, the beam containing the wavelengths $\lambda_2$ to $\lambda_6$ is reflected by the filter 21, again being transmitted through the body 40 to the next frequency selecting filter means 22 which is adapted to pass only a beam of $\lambda_2$ wavelength. The beam of wavelength $\lambda_2$, after passing the filter 22, is converged by the lens 12 and coupled to the fiber 32. Also, the beam containing the wavelengths $\lambda_3$ to $\lambda_6$, is reflected by the filter 22, and coupled through the lenses 13, 14, 15, and 16 for the beam convergence to the output fibers 33, 34, 35, and 36, respectively. As can be seen in FIG. 2, the internal reflecting pattern within body 40 is substantially star-shaped.

Figure 3:
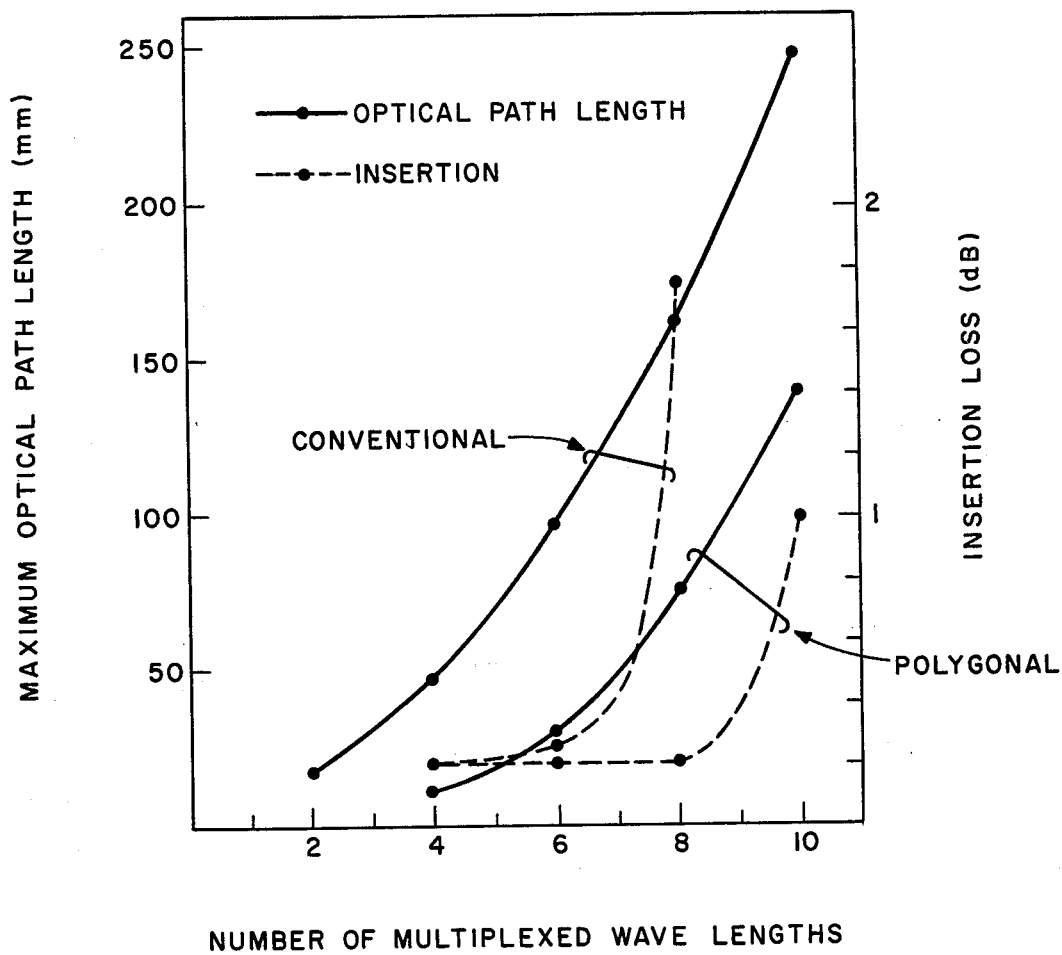
FIG. 3 is a diagram illustrating the advantages of the embodiment.

FIG. 3 illustrates the optical path length and insertion loss characteristics vs. the number of multiplexed wavelengths which is equivalent to the numbers M of the side faces (N) of the polygon minus one, as taught by this invention. The incident angles with respect to the interference filters of the side faces are set at 90 degrees N. The fiber distance is 7 mm in the shortest length between the adjacent fibers. The optical path lengths from the end of the input fiber to the end of the last output fiber are calculated and shown. The insertion loss caused by the aberration of a collimating lens system along the distance from the input fiber to the last fiber are measured and shown.

The characteristics of the structure of reference having the same incident angles and the same fiber distances are also shown for comparison.

Generally, the larger the incident angle to the interference filter and the smaller will be the adjacent fiber distances and the shorter the optical path length from the input (or output) fiber to the last output (or input) fiber. However, a larger incident angle provides less steep filter characteristics. A smaller fiber distance is difficult to assemble because there is not enough space for the fiber adjustment. Therefore, both the prior art and the invention make a comparison with respect to the same incident angle and the same adjacent fiber distance, in the shortest length.

For a six component multiplexing or demultiplexing, the regular heptagonal prism is used in the invention, and the fibers are arranged so that the incident angles are 12.9 degrees and the fiber distances of the shortest length between adjacent fibers is 7 mm. As a result, the optical path lengths are reduced by about one-third, thereby achieving a reduction of insertion loss. The improvement on insertion loss caused by the abberation of a collimating lens system is particularly important when more than eight wavelengths are demultiplexed or multiplexed.

Furthermore, as is evident from the structure shown in FIG. 1, the structural elements (lenses, filters, and fibers) are arranged approximately in symmetry with respect to the optical axis, which is radially extended. The forces of thermal expansion are exerted over those elements uniformly, with respect to the optical axis. As a result, the deviation of the optical axis, due to thermal expansion, is extremely reduced, for enabling the achievement of a highly reliable optical device.

The optical demultiplexer of FIG. 1, formed of the structural elements given in Table 1, has been found to have the wavelength-insertion loss relationship shown in Table 2.

TABLE 1

| Optical fibers | Graded-index type fibers |
| --- | --- |
| Optical energy transmissive body | Heptagonal prism, each side measuring 2.5 millimeters long and 4.5 millimeters high. |
| Spacers | Pieces of glass inclined at an angle A of 12.9 degrees. |
| Lenses | Graded-index rod lenses measuring 2 millimeters in diameter and 6 millimeters in length. |
| Interference filters | Each consisting of 25 alternate layers of $SiO_2$ and $Ti_2$ 4 millimeters (width) × 2.3 millimeters (length) × 0.2 millimeter (height) |

TABLE 2

| Wavelength (microns) | 1.1 | 1.2 | 1.3 | 1.4 | 1.5 | 1.6 |
| --- | --- | --- | --- | --- | --- | --- |
| Insertion loss (dB) | 1.0 | 0.8 | 1.2 | 1.1 | 1.0 | 0.9 |

A heptagonal prism is used in this embodiment to form an optical demultiplexer which is suited for six wavelengths. However the same heptagonal prism can be used to achieve an optical demultiplexer for any number of wavelengths between two and five, inclusive.

Although the embodiment shown in FIG. 1 is described as a demultiplexer, the embodiment also operates as a multiplexer when the demultiplexer operation is reversed.

As hetherto described, the present invention can provide a highly reliable optical device, which operates with an extremely reduced insertion loss.

What is claimed is:

1. An optical multiplexer/demultiplexer for use in a wavelength division multiplexing system, which comprises optical energy transmission body means having N side faces, N being equal to or larger than three; first means associated with a first predetermined one of said N side faces for directing a single beam of radiant energy at a predetermined angle with respect to said predetermined one side face, said single beam being directed into or out of said body for a demultiplexing or multiplexing operation, said single beam containing M preselected wavelengths, M being equal to or smaller than $N-1$; a plurality of second means associated in a one-to-one correspondence with $(M-1)$ side faces of said N side faces, each of said plurality of second means passing a beam containing a corresponding one of said M wavelengths and reflecting a beam containing at least one wavelength of said M wavelengths, other than said corresponding wavelength; third means associated with a second predetermined one of said N side faces for passing a beam finally reflected by said plurality of second means; and a plurality of fourth means associated in a one-to-one correspondence with said plurality of second means and with said third means, each of said plurality of fourth means receiving or transmitting a corresponding one of the beam passing through said second and third means for the demultiplexing or multiplexing operation.

2. An optical multiplexing/or demultiplexing device comprising an optical energy transmission body having at least three faces, said faces being set at an angle which internally reflects all optical energy other than a passing beam, means for directing a beam of said energy toward any one of said faces at a first predetermined angle which causes substantially all of said energy to enter said body, said beam of energy containing a number of different wavelengths which is no more than one less the number of said faces, a plurality of optical energy frequency selective means each for selecting and passing a different single wavelength beam of said energy, each of said selective means being individually associated with a corresponding one of said faces for passing a corresponding one of said wavelengths and for reflecting other of said wavelengths, said transmission body internally reflecting the other wavelengths of said optical energy to the other faces, one of said other faces passing said reflected energy when the wavelength of its associated selective means corresponds to the reflected wavelength, the directions of reflection being substantially diametrically across said body to a different face whereby the directions of internal light reflecting forms a pattern within said body which has a substantially star shape, and means individually associated with said frequency selective means for receiving or transmitting a beam containing energy at the wavelength which is passed through said associated frequency selective means.

3. The device of claim 2 wherein said optical energy is a beam of laser light.

4. The device of claim 2 wherein each of said selective means is an interference optical filter for passing an individually associated single one of said different wavelengths.

5. The device of claim 4 wherein said means for receiving or transmitting a beam comprises a collimating lens and an optical fiber.

6. The device of claim 5 wherein said predetermined angle is set by spacer means positioned between each of said collimating lens and said frequency selective means for setting the position of said lens and therefore the angle of incidence at which said beam strikes a face of said body.

7. The device of any one of the claims 1-6 wherein said body has seven faces.

8. The device of claim 7 wherein said frequency selective means are interference filters.

9. An optical multiplex/demultiplex device, for use in a wavelength division multiplex system, comprising: a single polygonal light transmission body having at least five side faces; a first optical port disposed at one of the side faces of the polygonal light transmission body for receiving from or emanating to the polygonal light transmission body a single beam containing at least three wavelength components; a plurality of second optical ports disposed at others of the side faces of the polygonal light transmission body for coupling to the polygonal light transmission body, the first and second optical ports having a collimating lens and an optical fiber, each of said optical ports being arranged in the polygonal light transmission body to extend in a radial fashion; and interference filters disposed between the side faces and the second optical ports for passing a specific component and reflecting other components, the single beam emanated from the first port and going through the polygonal light transmission body being reflected by the interference filters one after another to couple to the second optical ports, each component beam emanating from each second port through each interference filter and going through the polygonal light transmission body being reflected by the interference filters one after another couple to the first port responsive to a multiplex and demultiplex operation, respectively.

10. The optical multiplex/demultiplex device of claim 9, wherein optical beams propagate within the polygonal light transmission body in a star-configuring fashion.

11. The optical multiplex/demultiplex device of claim 10, wherein the polygonal light transmission body is of a regular polygon having an odd number of the side faces.

12. The optical multiplex/demultiplex device of claim 10, wherein the polygonal light transmission body is heptagonal.

13. The optical multiplex/demultiplex device of claim 12, further comprising a third optical port which is disposed at the side face of the first optical port having no interference filter and is most apart in an optical path length from the first optical port compared with the second optical ports.

* * * * *